(12) United States Patent
Akazaki et al.

(10) Patent No.: US 7,162,360 B2
(45) Date of Patent: Jan. 9, 2007

(54) COMBUSTION STATE DETECTING APPARATUS FOR AN ENGINE

(75) Inventors: Shusuke Akazaki, Saitama (JP); Futoshi Koga, Saitama (JP); Masaki Ueno, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/268,728

(22) Filed: Nov. 8, 2005

(65) Prior Publication Data

US 2006/0116812 A1 Jun. 1, 2006

(30) Foreign Application Priority Data

Nov. 9, 2004 (JP) .............................. 2004-324997
Nov. 10, 2004 (JP) .............................. 2004-326041

(51) Int. Cl.
*G01M 15/08* (2006.01)
*F02P 17/00* (2006.01)

(52) U.S. Cl. ...................................... 701/114; 73/35.04

(58) Field of Classification Search ................ 701/114, 701/115, 107, 101, 111; 73/118.1, 118.2, 73/117.2, 117.3, 35.03, 35.04, 35.01, 35.12
See application file for complete search history.

(56) References Cited

U.S. PATENT DOCUMENTS 6,332,352 B1* 12/2001 Sano ........................ 73/117.3

6,810,320 B1* 10/2004 Yamamoto et al. ......... 701/111

FOREIGN PATENT DOCUMENTS

JP  03-246374 A  1/1991

* cited by examiner

*Primary Examiner*—Willis R. Wolfe, Jr.
*Assistant Examiner*—Johnny H. Hoang
(74) *Attorney, Agent, or Firm*—Arent Fox PLLC (57) ABSTRACT

A combustion state detecting apparatus is provided for an engine having internal pressure sensor for detecting an internal pressure of a combustion chamber of the engine and crank angle detector for detecting a crank angle of the engine. The apparatus calculates a volume of the combustion chamber based on the crank angle detected by the crank angle detector and estimator for estimating a motoring pressure of the engine in accordance with a calculation equation using the calculated volume. The apparatus adjusts either of the pressure detected by the internal pressure sensor and the pressure estimated by the estimator during a compression stroke of the engine to minimize the error between the detected pressure and the estimated pressure. The apparatus determines a combustion state during a combustion stroke of the engine based on a relation between the pressure adjusted and the other pressure. The apparatus identifies parameters of the calculation equation during a compression stroke of the engine to minimize the error between the pressure detected by the internal pressure sensor and the pressure estimated by the estimator.

20 Claims, 10 Drawing Sheets

COMBUSTION STATE DETECTING APPARATUS FOR AN ENGINE

BACKGROUND OF THE INVENTION

The present invention relates to a technique for detecting a misfiring in an internal-combustion engine.

The Japanese Patent Application Publication No. H3-246374 discloses a technique for estimating a movement of a motoring pressure (a pressure at a misfiring time) of an engine by detecting an internal pressure of a combustion chamber of the engine for each predetermined crank angle, setting a bias amount of an internal pressure detection signal based on an internal pressure detection signal sampled in a sampling period and a volume of the combustion chamber, correcting the sampled internal pressure detection signal based on the set bias amount and estimating the movement of the motoring pressure based on the corrected internal pressure and the combustion chamber volume. An occurrence or no occurrence of misfiring is determined by comparing this estimated pressure with the detected pressure in a combustion cycle.

According to the above-described conventional technique, the internal pressure is first obtained by correcting the internal pressure signal with the bias amount and then the motoring pressure is estimated based on the corrected internal pressure and the combustion chamber volume. However, this technique has a weak point in reliability for correcting the detected pressure value with the bias amount because the detected pressure is corrected with the bias amount at a certain time point when the internal pressure changes abruptly under a transient operation of the engine and because the characteristic of the output of the internal pressure varies due to such several factors as the sensor attachment state, change of temperatures at the sensor attachment portion, aging deterioration and so on. Therefore, there is a need for improving reliability of the motoring pressure that is estimated from such corrected pressure value.

SUMMARY OF THE INVENTION

In order to resolve the above-described problem, the present invention provides a combustion state detecting apparatus for an engine having internal pressure detecting means for detecting an internal pressure of a combustion chamber of the engine and crank angle detecting means for detecting a crank angle of the engine. The apparatus has calculation means for calculating a volume of the combustion chamber based on the crank angle detected by the crank angle detecting means and estimation means for estimating a motoring pressure of the engine in accordance with a calculation equation using the calculated volume. The apparatus adjusts either of the pressure detected by the internal pressure detecting means and the pressure estimated by the estimation means during a compression stroke of the engine to minimize the error between the detected pressure and the estimated pressure. The apparatus further includes determination means for determining a combustion state during a combustion stroke of the engine based on a relation between the pressure adjusted by the adjustment means and the other pressure.

According to one aspect of the present invention, the adjustment means includes identification means for identifying parameters of the calculation equation during a compression stroke of the engine to minimize the error between the pressure detected by the internal pressure detecting means and the pressure estimated by the estimation means. Besides, the determination means determines the combustion state based on a relation between the detected pressure and the estimated pressure that is adjusted to minimize the error.

According to another aspect of the present invention, the adjustment means includes modification means for modifying, during a compression stroke of the engine, the pressure detected by the internal pressure detecting means in accordance with a modification equation and identification means for identifying parameters of the modification equation to minimize the error between the pressure modified by the modification means and the pressure estimated by the estimation means. Besides, the determination means determines a combustion state based on the estimated pressure and the detected pressure that is modified to minimize the error.

According to further aspect of the present invention, the calculation equation is an equation of state for gases in the combustion chamber and the identification of the parameters are performed in a crank angle during an interval from a close of an air intake valve up to a transition to a combustion stroke.

According to yet further aspect of the present invention, the estimation means includes motoring pressure calculating means for calculating a motoring pressure based on the combustion chamber volume calculated by the calculating means and modification means for modifying the motoring pressure by using the parameters identified by the identification means.

According to yet further aspect of the present invention, the identification means is structured to calculate a standard deviation between the estimated pressure values and the detected pressures and then determine that the standard deviation between the estimated pressure values and the detected pressures converges when the standard deviation is equal to or smaller than a predetermined value to adopt the identified parameters.

According to yet further aspect of the present invention, the identification means is structured to calculate a standard deviation between the estimated pressure values and the detected pressures and then determine that the standard deviation between the estimated pressure values and the detected pressures converges when the standard deviation is equal to or smaller than a predetermined value to adopt the identified parameters.

According to yet further aspect of the present invention, the determination means determines a misfiring in the engine. This determination of the misfiring is performed through comparison of a ratio between the estimated pressure and the detected pressure with a predetermined value.

According to the present invention, the parameters of the calculation equation are identified to minimize the error between the pressure estimated by the estimated means and the detected pressure, and then the motoring pressure is estimated by using such identified parameters. Besides, these parameters are identified during a compression stroke and then used to estimate the motoring pressure in a combustion stroke immediately after the compression stroke. As a result, the motoring pressure can be estimated in a high precision level.

In case of a gasoline engine, the combustion stroke of the engine corresponds to a stroke after an ignition and in case of a diesel engine, it corresponds to a stroke after a fuel injection.

DESCRIPTION OF THE PREFERRED EMBODIMENTS

Figure 1:
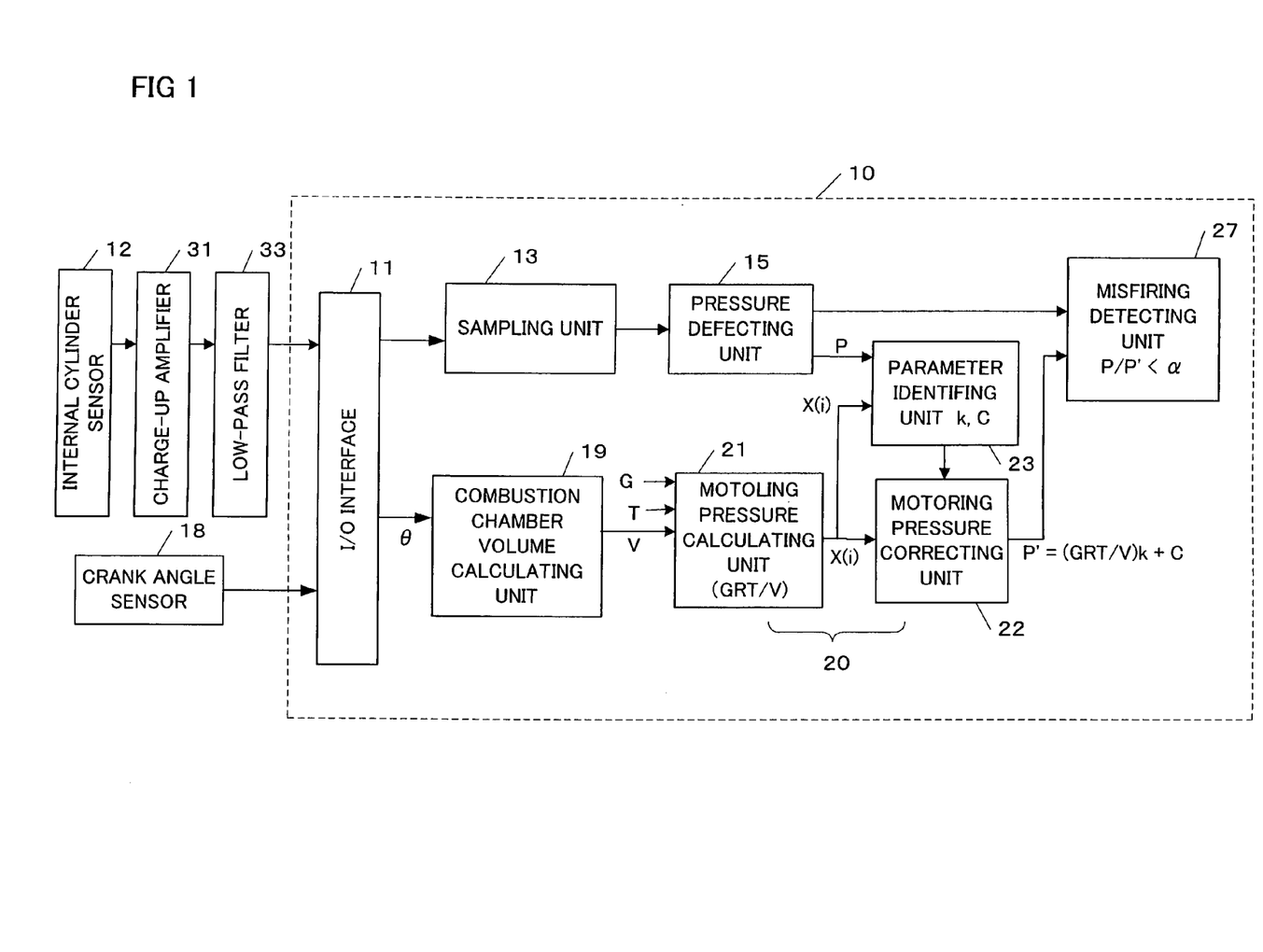
FIG. 1 shows functional blocks of one embodiment of the present invention.

Some embodiments of the present invention will be described below with reference to the accompanying drawings. FIG. 1 is a block diagram of an overall structure of a combustion state detecting apparatus in accordance with one embodiment of the present invention. An electronic control unit (hereinafter referred to as an "ECU") 10 is a computer having a central processing unit (CPU). The ECU includes a Read-Only Memory (ROM) for storing computer programs and a Random Access Memory (RAM) for providing a working space to the processor and temporarily storing data and programs. An input/output interface 11 receives a detection signal from each section of an engine and performs an A/D (analog to digital) conversion on each signal to deliver it to the next stage. The input/output interface 11 also sends a control signal based on a result of an operation of the CPU to each section of the engine. In FIG. 1, the ECU is shown as functional blocks representing functions related to this invention.

Figure 2:
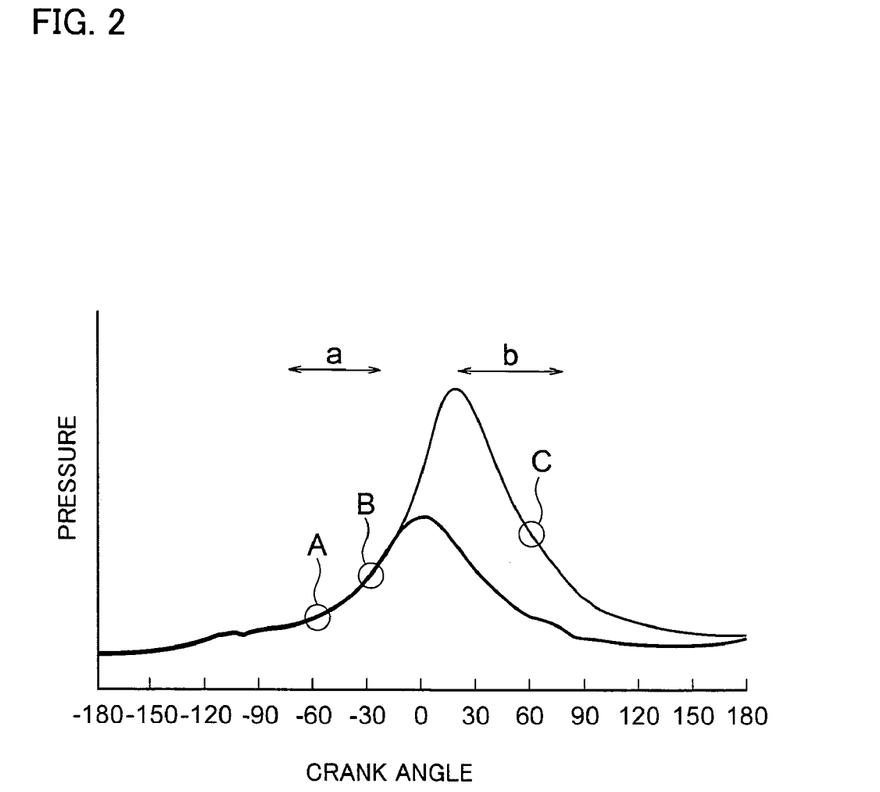
FIG. 2 schematically shows a motoring pressure curve and a pressure curve during a normal combustion.

FIG. 2 schematically shows a principle of a misfiring determination in accordance with this invention. Curve 1 shows a movement of a motoring pressure (a pressure at a misfiring time) in one cylinder of the engine and Curve 3 shows a movement of an internal pressure during a normal combustion in the same cylinder. A crank angle of 0 degree indicates a top dead center (TDC). The motoring pressure reaches a peak at the TDC and the internal pressure during the combustion (Curve 3) reaches a peak around an ignition time after the TDC.

In this invention, parameters in an equation of state for gases are identified in a period before a TDC during a compression stroke, for example, a period of "a" shown in FIG. 2. As will be shown later by equations, this identification is performed by calculating values of parameters for the equation of state for gases in the cylinder through use of the method of least squares to minimize a difference (PM–PS) between an estimated value PM of the motoring pressure based on the equation of state at Point A, Point B and so on shown in FIG. 2 and an internal pressure PS obtained from an output of an internal pressure sensor 12. Using the equation of state whose parameters have been thus identified, the motoring pressure PM (Curve 1) in one cycle including a combustion stroke in one cylinder is calculated. Accordingly, Curve 1 is reliable because it is the internal pressure that is calculated according to the equation of state using the parameters that are identified in the compression stroke immediately before the combustion stroke.

Subsequently, a combustion state, for example, a misfiring occurrence, is determined based on a relation between the internal pressure value PS (Curve 3) obtained from the output of the internal pressure sensor 12 at a time point after a combustion of air-fuel mixture has started in the combustion stroke, for example, at a time point shown by C in the period "b" in FIG. 2 and the motoring pressure PM (Curve 1) calculated according to the above-described equation of state. In one embodiment, it is determined that a misfiring has occurred when a ratio of PS/PM is smaller than a predetermined threshold value.

Referring back to FIG. 1, the internal pressure sensor 12, which is a piezo-electric element, is disposed in a vicinity of a spark plug of each cylinder of the engine. The pressure sensor 12 outputs an electric charge signal corresponding to the pressure inside the cylinder. This signal is converted to a voltage signal by a charge amplifier 31 and output to the input/output interface 11 through a low-pass filter 33. The input/output interface 11 sends the signal from the pressure sensor 12 to a sampling unit 13. The sampling unit 13 performs a sampling in a predetermined interval, for example, in an interval of $\frac{1}{10}$ kHz and delivers the sample value to a pressure detecting unit 15. In this embodiment, the pressure detecting unit 15 provides a detected pressure value PS to a misfiring determining unit 27 for every 15 degrees of crank angle.

On the other hand, a combustion chamber volume calculating unit 19 calculates a volume $V_c$ of a combustion chamber of the cylinder corresponding to the crank angle $\theta$ in accordance with Equation (1) and Equation (2).

$$m = r\{(1-\cos\theta) + \lambda - \sqrt{\lambda^2 - \sin^2\theta}\} \quad (1)$$

$$V_c = V_{dead} + A_{pstn} \times m \quad (2)$$

Figure 3:
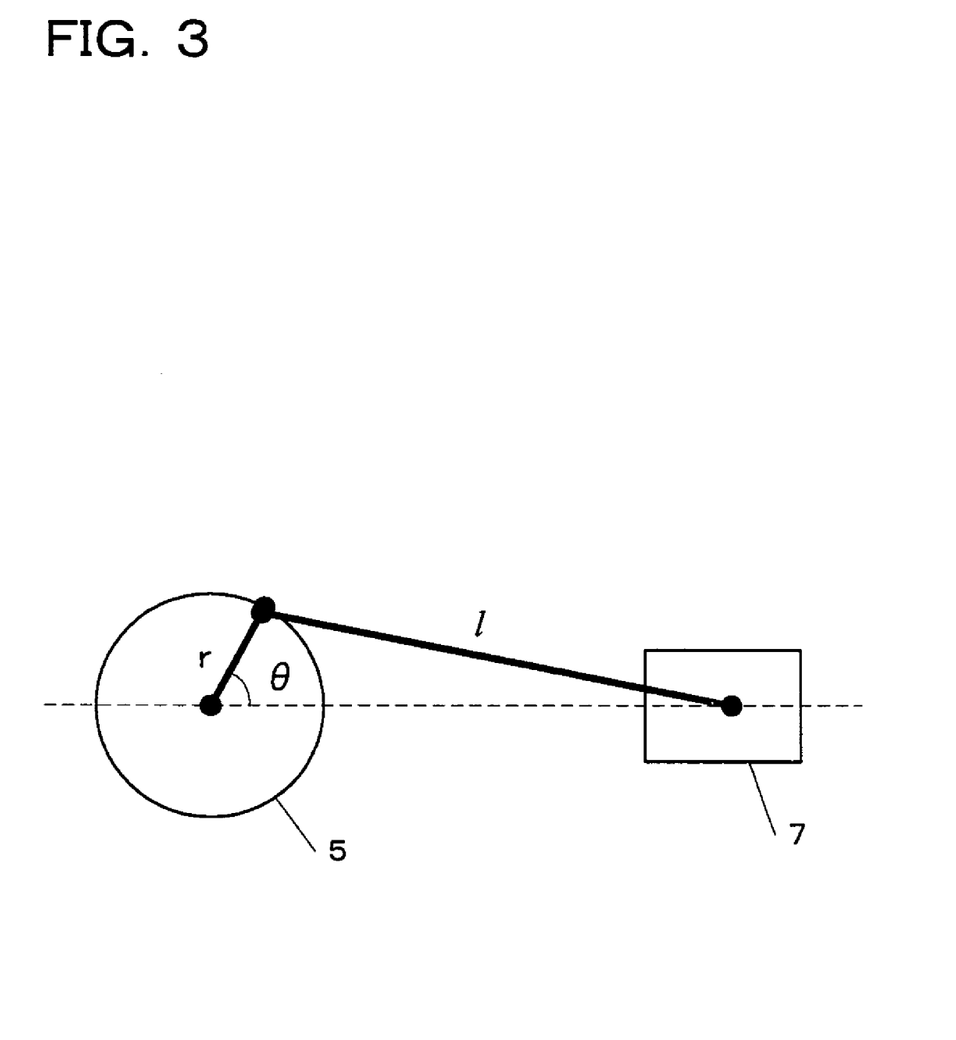
FIG. 3 schematically shows how to calculate a piston position.

In Equation (1) and Equation (2), "m" indicates a displacement of a piston 7 from a TDC. The displacement is calculated from a relation shown in FIG. 3. Assuming that "r" is a crank radius and "l" is a length of a connecting rod, $\lambda = l/r$. "$V_{dead}$" represents a combustion chamber volume when the piston is located at the TDC and "$A_{pstn}$" represents a cross-sectional area of the piston.

It is known that an equation of state for a cylinder is expressed as in Equation (3). A motoring pressure estimating unit 20 includes a motoring pressure calculating unit 21 and a motoring pressure modifying unit 22. The motoring pressure calculating unit 21 calculates a basic motoring pressure GRT/V that is a basic term in Equation (3). The motoring pressure modifying unit 22 modifies the basic motoring pressure by using the parameters to be obtained in a parameter identifying unit 23 and calculates an estimated value PM of a motoring pressure in the combustion chamber (a pressure at a time of no combustion) corresponding to the crank angle according to the equation of state in Equation (3).

$$PM = (GRT/V_c) \times k + C \quad (3)$$

$$PM = kX(i) + C \quad (4)$$

In Equation (3), "G" indicates an intake air amount obtained, for example, from an air flow meter, or based on an engine rotational speed and an intake air pressure. "R" represents a gas constant, "T" represents an intake air temperature obtained, for example, from an intake air temperature sensor, or based on operating conditions such as an engine water temperature etc. "k" is a correction coefficient and C is a constant. By expressing a discrete value of $GRT/V_c$ in Equation (3) as X(i), Equation (4) is obtained.

The parameter identifying unit 23 identifies the parameters k and C in Equation (4) through use of the method of least squares to minimize the difference (PM–PS) between the estimated value PM of the motoring pressure calculated in the compression stroke by the motoring pressure estimating unit 20 and the internal pressure PS detected by the pressure detecting unit 15 from the internal pressure sensor 12. By expressing discrete values of the PM with p'(i), sample values (discrete values) of the internal pressure PS obtained from the internal pressure sensor with p(i) and discrete values of X(i) with x(i), following expressions are obtained: $PM^T=[p'(0), p'(1), \ldots, p'(n)]$, $PS^T=[p(0), p(1), \ldots, p(n)]$, $X(i)^T=[x(0), x(1), \ldots, x(n)]$. A sum of squares of the discrete values of the error (PM–PS) is expressed as in Equation (5). It is assumed that the sample values are taken in an interval of 1/10 kHz and the value of "i" is limited up to 100 for example.

$$F=\Sigma[(p(i)-p'(i))]^2=\Sigma[p(i)-(kx(i)+C)]^2 =\Sigma[p(i)^2-2p(i)\times(kx(i)+C)+(kx(i)+C)^2] \quad (5)$$

k and C for minimizing the value of F are obtained as the values of k and C when a partial differential with respect to each of k and C for F(k, C) becomes zero. These differential operations are expressed as in Equation (6) and Equation (7).

$$\partial F/\partial k=\Sigma[-2p(i)x(i)+2kx(i)^2+2Cx(i)]=0 \quad (6)$$

$$\partial F/\partial C=\Sigma[-2p(i)+2C+2kx(i)]=0 \quad (7)$$

By simplifying the right sides of these equations, Equation (6)' and Equation (7)' are obtained.

$$\Sigma p(i)x(i)=k\Sigma x(i)^2+C\Sigma x(i) \quad (6')$$

$$\Sigma p(i)=k\Sigma x(i)+C\times n \quad (7')$$

By expressing these equations by a matrix, Equation (8) is obtained.

$$\begin{bmatrix}\sum p(i)x(i) \\ \sum p(i)\end{bmatrix} = \begin{bmatrix}\sum x(i)^2 & \sum x(i) \\ \sum x(i) & n\end{bmatrix}\begin{bmatrix}k \\ C\end{bmatrix} \quad (8)$$

Furthermore, Equation (8) can be transformed into Equation (9) by using an inverse matrix.

$$\begin{bmatrix}k \\ C\end{bmatrix} = \begin{bmatrix}\sum x(i)^2 & \sum x(i) \\ \sum x(i) & n\end{bmatrix}^{-1}\begin{bmatrix}\sum p(i)x(i) \\ \sum p(i)\end{bmatrix} \quad (9)$$

The inverse matrix in the right side is expressed as in Equation (10).

$$\begin{bmatrix}\sum x(i)^2 & \sum x(i) \\ \sum x(i) & n\end{bmatrix}^{-1} = \frac{1}{DET}\begin{bmatrix}n & -\sum x(i) \\ -\sum x(i) & \sum x(i)^2\end{bmatrix} \quad (10)$$

$$DET = \sum x(i)^2 \times n - \sum x(i) \times \sum x(i) \text{ (where, DET} \neq 0)$$

As clearly understood from a series of the above-described equations, the parameters k and C of the equation of state can be calculated by using the discrete values X(i) of the basic motoring pressure and the discrete values P(i) of the internal pressure detected based on the output of the pressure sensor 12. The motoring pressure estimating unit 20 uses such identified parameters to calculate the estimated value of the motoring pressure for each cylinder. Specifically, the motoring pressure calculating unit 21 calculates the discrete values X(i) of the basic motoring pressure based on the combustion chamber volume, and the motoring pressure modifying unit 22 calculates the estimated value P' of the motoring pressure by using the parameters identified by the parameter identifying unit 23. The discrete values X(i) are calculated, for example, in an interval of 1/10 kHz, and the parameters k, C are identified based on a predetermined number of discrete values, for example, 100 discrete values. The motoring pressure modifying unit 22 uses these parameters to calculate the estimated motoring pressure value PM in a combustion stroke. Preferably, the parameters k, C are identified multiple times in a compression stroke to calculate the estimated motoring pressure value PM based on the respective average values for the parameters k, C.

At a specific time point, for example, the time point C in the period "b" after the ignition time (FIG. 2), the misfiring determining unit 27 determines an occurrence or no occurrence of misfiring based on the value PS of the internal pressure detected by the internal pressure sensor 12 and the estimated motoring pressure value PM calculated at the same time by the motoring pressure estimating unit 20. In this embodiment, the misfiring determining unit 27 determines that a misfiring has occurred when a value of PS/PM is smaller than a predetermined threshold value $\alpha$.

Figure 4:
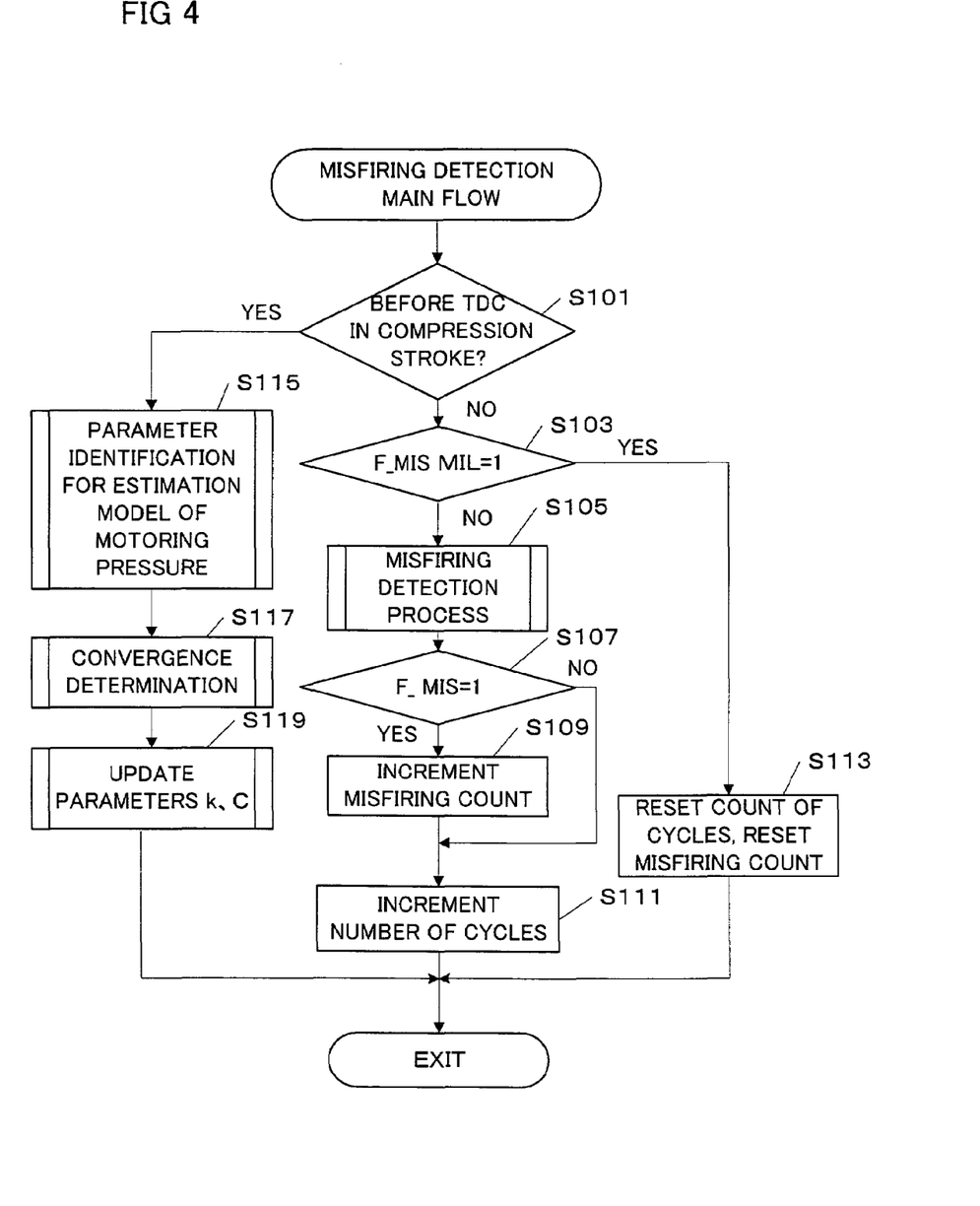
FIG. 4 is a flowchart of a main process for a misfiring detection.

FIG. 4 is a flowchart of a process that is performed for every 15 degrees of crank angle. It is determined whether or not the current process is before the TDC in the compression stroke (S101) and when it is before the TDC, the process for identifying the parameters of the motoring pressure estimation model is started (S115). After the identification operation for the parameters, the convergence determination is performed (S117). When, the convergence is confirmed, the parameters k, C are updated (S119).

When it is not before the TDC in Step S101, it is examined whether or not the misfiring flag MIL is set to 1 (S103). When this flag is set to 1, it indicates that the misfiring determination has been already performed several times and the misfiring warning has been issued. When this flag is not set to 1, the misfiring determination process is started (S105). When the misfiring occurrence is determined as a result of the misfiring determination, the misfiring flag is set to 1 (S07) and then the count of the misfiring times is incremented (S109). When the misfiring determination process is started (S105), the count of the determination cycle, that is, the number of cycles, is incremented (S111). As will be described later, the number of cycles is counted so that the misfiring MIL (misfiring warning) can be issued based on how many times the misfiring has occurred during a predetermined number of cycles.

When the misfiring flag MIL is set to 1, the count of cycles and the count of the misfiring are reset and then the process is terminated (S113).

Figure 5:
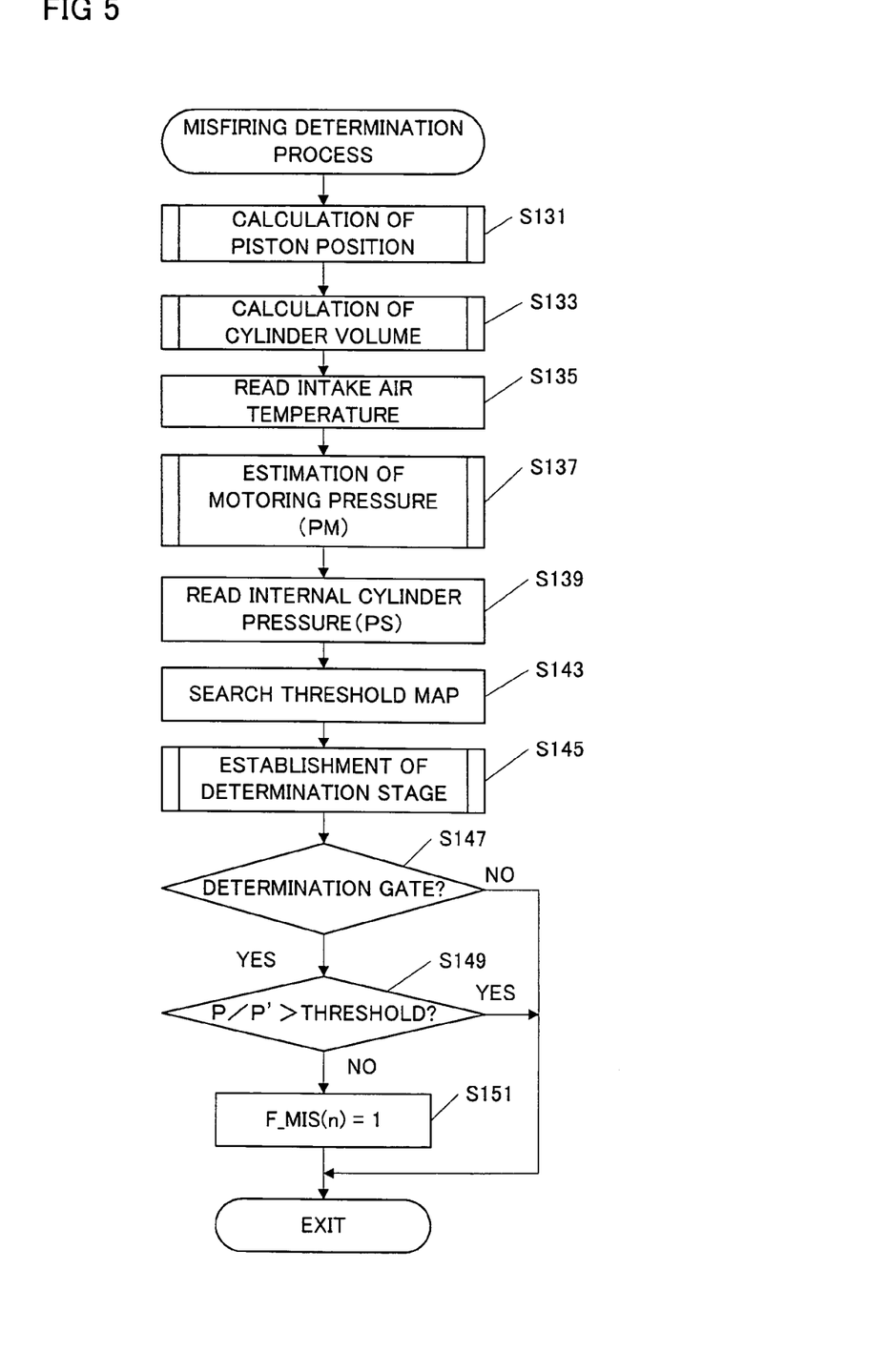
FIG. 5 is a flowchart of a misfiring determination process.

Now, referring to FIG. 5, the misfiring determination process (S105 of FIG. 4) will be described in detail. At first, a displacement m (distance) of the piston from the TDC to the current position is calculated in accordance with Equation (1) (S131). Then, using this displacement m, the current volume $V_c$ of the cylinder is calculated in accordance with Equation (2) (S133). The intake air temperature is read from the temperature sensor disposed in the air intake pipe of the engine (S135) and the estimated value PM of the motoring pressure is calculated in accordance with Equation (3) (S137).

The actual internal pressure PS based on the output of the internal pressure sensor is read (S139) and a map of the threshold value for the misfiring determination is searched based on the engine rotational speed NE and the absolute air intake pipe pressure (S143). Since the motoring pressure is different depending on the engine load conditions, determination threshold values corresponding to the load conditions are prepared in advance as a map to be used for searching for the appropriate threshold value.

Then, a determination stage is established (S145). The stage judgment is required in order to perform a misfiring determination at the most appropriate timing corresponding to the engine condition. For example, in case of an engine including a variable valve mechanism having a function of variably changing timing of an intake/exhaust valve, a determination stage is selected depending on whether or not the timing is controlled for higher rotational speeds, whether or not the condition is in an idle, whether or not the condition is in a fire mode (that is, a mode for retarding the ignition timing to send the exhaust gas of the higher temperature to the exhaust system in order to activate the catalyst in the exhaust system after the start of the engine) or the like. In each stage map, a respective time for allowing a misfiring determination (a particular time in the period "b" in FIG. 2) is established. This particular time is referred to as a "determination gate" in Step S147 of FIG. 5.

When the current state is in a determination gate, it is determined whether or not a ratio PS/PM of the actual internal pressure value PS against the estimated motoring pressure PM is larger than the determination threshold value obtained through the search in Step 143 (S149). When the ratio PS/PM is larger than the threshold value, it is determined that the normal ignition is performed, and then the process is terminated. When the ratio PS/PM is equal to or smaller than the threshold value, it is determined that a misfiring has occurred, and the misfiring flag is set to 1 (S151). When the number of times for the misfiring occurrence exceeds a determination value within a predetermined time period, a misfiring judgment is determined, so the misfiring warning (misfiring MIL) is set to ON. This matter will be further described later with reference to FIG. 8.

Figure 6:
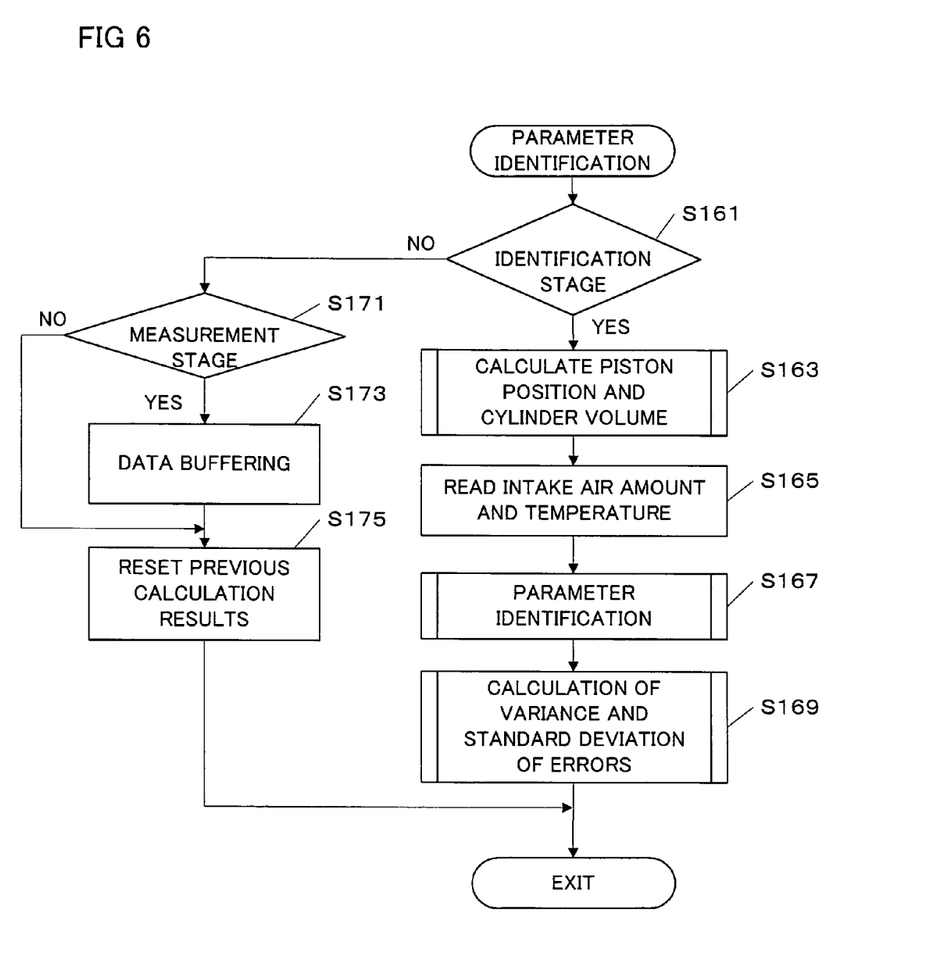
FIG. 6 is a flowchart of a parameter identification process.

Now, referring to FIG. 6, a parameter identification process will be described. The parameter identification process is performed around end of a compression stroke, that is, in the vicinity of the TDC. A state where the piston is located near the end of the compression stroke is referred to as an identification stage. When the state is in an identifications stage, the piston position is calculated in accordance with Equation (1) by using the data to be obtained in a measurement stage that will be described later and the cylinder volume is calculated in accordance Equation (2) (S163). The intake air amount and the intake air temperature are read (S165) and the parameters k and C are identified in accordance with Equation (6) (S167). Then, a variance and a standard deviation of the error are calculated (S169). This is a calculation for determining whether or not the equation of state expressed by Equation (3) converges by the identified parameters (this matter will be further described later with reference to FIG. 7).

When the state is not in the identification stage in Step S161, it is determined whether or not the state is in the measurement stage that is a stage for collecting the data used for the operation of the parameter identification (S171). When in the measurement stage, the data are stored in the buffer (S173) and the result of the previous calculation is reset (S175) and then the process is terminated. When not in the measurement stage, the result of the previous calculation is reset and then the process is terminated.

Figure 7:
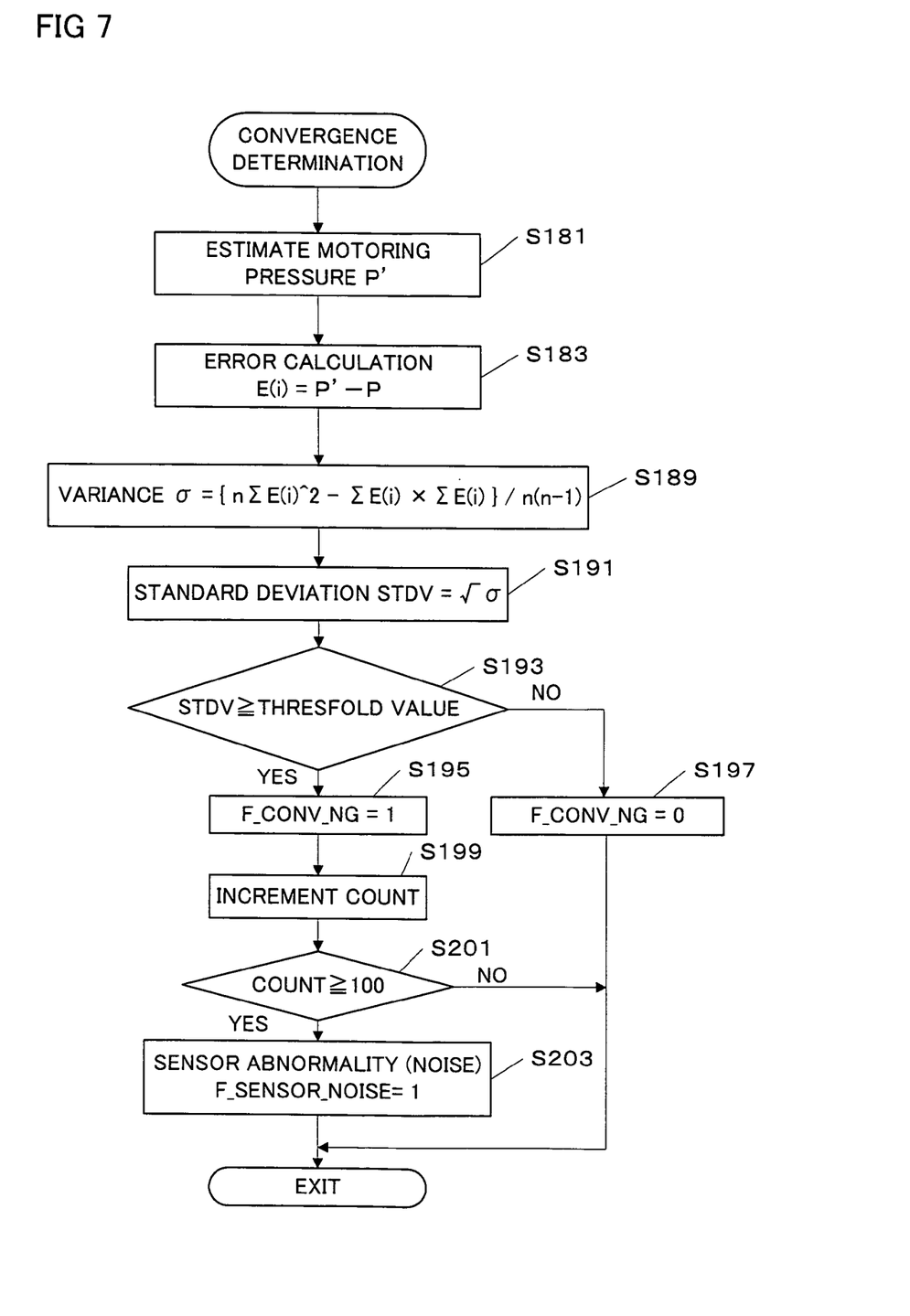
FIG. 7 is a flowchart of a convergence determination process.

Referring to FIG. 7, the variance and the standard deviation, or, their approximate values, of the error between the estimated motoring pressure value P' calculated through the equation of state of Equation (3) using the identified parameters k and C and the actual value of the internal pressure measured by the internal pressure sensor are calculated. In principle, when the standard deviation is equal to or smaller than a predetermined value, it is determined that the error between the estimated motoring pressure value PM and the measured value PS converges, so that the identified parameters k and C are adopted as appropriate parameters. When the error does not converge, there is a possibility of an occurrence of such trouble as a noise caused by the abnormality of the internal pressure sensor or an overflowing in the calculating operation.

The estimated value PM of the motoring pressure is calculated by Equation (3) (S181) and the error E(i)=PM−PS is calculated (S183). Based on the errors E(i), a variance or its approximate value a is calculated in accordance with a known calculation method (S189).

Then, a standard deviation STDV is calculated as a square root of such calculated variance (S191). When the standard deviation is equal to or larger than a predetermined threshold value (S193), it is determined that the error does not converge and a convergence-no-good flag (F_CONV_NG) is set to 1 (S195). The number of times in which the convergence-no-good flag (F_CONV_NG) is set to 1 is counted (S199) and when the count becomes 100 or larger (S201), a flag indicating the abnormality of the internal pressure sensor is set to 1. The process for the convergence determination in FIG. 7 is performed in the identification process (once in one cycle). The counting in Step S199 is performed for every 15 degrees of crank angle.

When the standard deviation does not reach the predetermined value in Step S193, it is determined that the error converges, so the convergence-no-good flag is set to 0 (S197) and the process is terminated.

Figure 8:
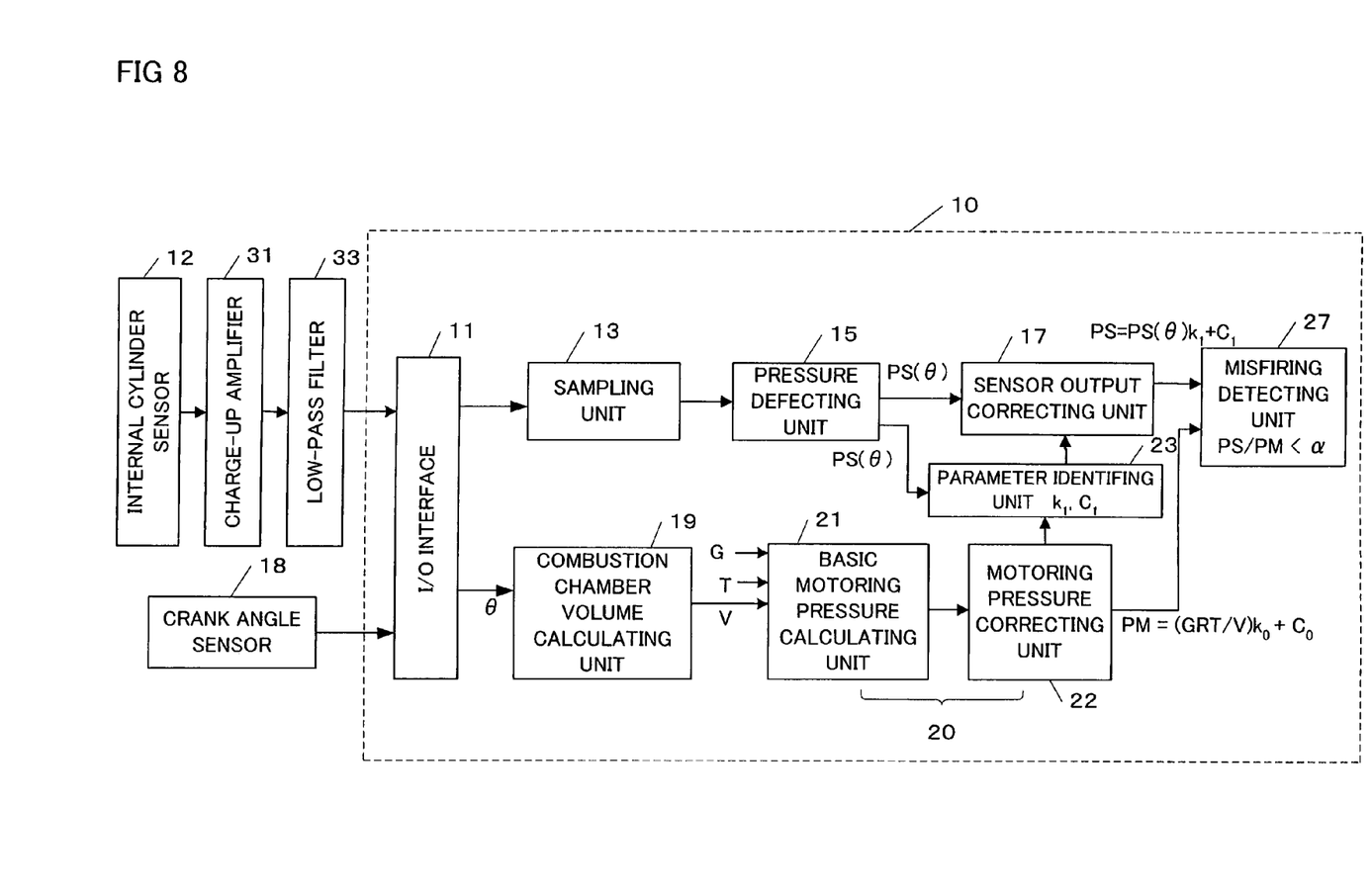
FIG. 8 shows functional blocks of another embodiment of the present invention.

FIG. 8 is a block diagram of an overall structure of a combustion state detecting apparatus in accordance with another embodiment of the present invention. An electronic control unit (hereinafter referred to as an "ECU") 10 is a computer having a central processing unit (CPU). The ECU includes a Read-Only Memory (ROM) for storing computer programs and a Random Access Memory (RAM) for providing a working space to the processor and temporarily storing data and programs. An input/output interface 11 receives a detection signal from each section of an engine and performs an A/D (analog to digital) conversion on each signal to deliver it to the next stage. The input/output interface 11 also sends a control signal based on a result of an operation of the CPU to each section of the engine. In FIG. 8, the ECU is shown as functional blocks representing functions related to this invention.

Figure 9:
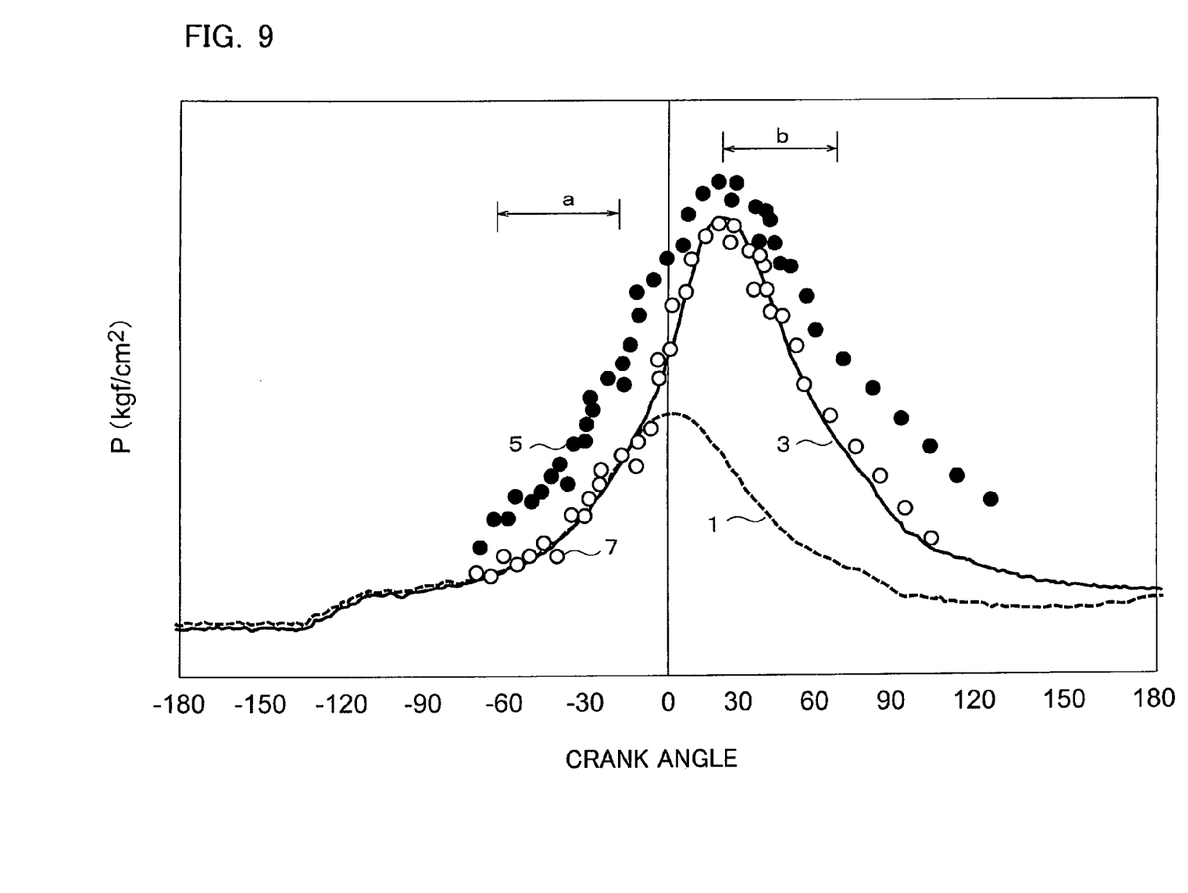
FIG. 9 schematically shows a motoring pressure curve and a pressure curve during a normal combustion.

At first, a principle of a misfiring determination according to this invention will be described with reference to FIG. 9. FIG. 9 shows pressures of a combustion chamber of a cylinder in a range of −180 degrees to 180 degrees of crank angle. The range of −180 degrees to 0 degree of crank angle is almost a compression stroke and the range of 0 degree to 180 degrees of crank angle is almost an expansion (combustion) stroke. Curve 1 shows a movement of a motoring pressure (pressure at a misfiring time) of one cylinder of an engine and Curve 3 shows a movement of an internal pressure during normal combustion in the same cylinder. The crank angle of 0 degree is a Top Dead Center (TDC). The motoring pressure reaches a peak at the TDC and the internal pressure during the combustion reaches a peak around an ignition time after the TDC.

In this invention, parameters of correction type for correcting a detection output from internal pressure detecting means (the internal pressure sensor 12 of FIG. 1) are identified in a period before the TDC is reached during the compression stroke, for example, a period of "a" shown in FIG. 2. Black dots 5 in FIG. 9 represent detection outputs from the internal pressure sensor 12. The characteristic of the internal pressure sensor 12 may change due to the influence of the temperature, aging deterioration or the like because the sensor is disposed in a very severe environment, that is, in a combustion chamber of an engine. In this invention, the detection output of the internal pressure sensor 12 is corrected to be placed almost on Curve 1 of the motoring pressure. Such corrected detection outputs are represented by white dots 7 in FIG. 9.

The correction of the detection output is performed by applying a correction equation $PS=PS(\theta)k_1+C_1$ to the detection output $PS(\theta)$ of the internal pressure sensor. $k_1$ is a correction coefficient and $C_1$ is a constant. These two parameters $k_1$ and $C_1$ of this correction equation are calculated through the method of least squares to minimize a square of a difference (PM−PS) between an estimated motoring pressure value PM and a value PS obtained by correcting an detection value of the internal pressure sensor according to the above-described correction equation in a certain period, for example, in the interval shown by "a" in FIG. 9, during a compression stroke.

Then, a combustion state, for example, an occurrence or no occurrence of misfiring, is determined based on a relation between the detection output 7 (white dot) obtained by correcting the output of the internal pressure sensor 12 and the motoring pressure PM (Curve 1) that is calculated through an equation of state. In one embodiment of the present invention, when a ratio of PS/PM is smaller than a predetermined threshold value, it is determined that a misfiring has occurred.

Referring back to FIG. 8, the internal pressure sensor 12, which is a piezo-electric element, is disposed in a vicinity of a spark plug of each cylinder of the engine. The pressure sensor 12 outputs an electric charge signal corresponding to the pressure inside the cylinder. This signal is converted to a voltage signal by a charge amplifier 31 and output to the input/output interface 11 through a low-pass filter 33. The input/output interface 11 sends the signal from the pressure sensor 12 to a sampling unit 13. The sampling unit 13 performs a sampling in a predetermined interval, for example, in an interval of $\frac{1}{10}$ kHz and delivers the sample value to a pressure detecting unit 15.

A sensor output correcting unit 17 corrects the sensor output PS ($\theta$) in accordance with the above-described correction equation $PS=PS(\theta)k_1+C_1$. The sensor output correcting unit 17 provides the sensor output value PS corrected in every 15 degrees of crank angle to a misfiring determining unit 27.

On the other hand, a combustion chamber volume calculating unit 19 calculates a volume $V_c$ of a combustion chamber of the cylinder corresponding to the crank angle $\theta$ in accordance with above-described Equation (1) and Equation (2).

In one embodiment of this embodiment, the motoring pressure based on the equation of state for gases of the combustion chamber is estimated by using Equation (11). Equation (11) is obtained as follows: at first, the pressure of the combustion chamber is actually measured by using, for example, a crystal piezoelectric type of sensor that is not influenced from the temperature change or the like at a portion of the sensor attachment. By corresponding this actual pressure value to Equation (3), the value $k_0$ of k and the value $C_0$ of C are obtained. Then, Equation (11) is obtained by substituting the values $k_0$ and $C_0$ into Equation (3).

$$PM=(GRT/V_c)\times k_0+C_0 \qquad (11)$$

A motoring pressure estimating unit 20 includes a motoring pressure calculating unit 21 and a motoring pressure modifying unit 22. The motoring pressure calculating unit 21 calculates a basic motoring pressure GRT/V that is a basic term in Equation (3). The motoring pressure correcting unit 22 corrects the basic motoring pressure by using the parameters $k_0$ and $C_0$ which are obtained in the above-described manner. These parameters $k_0$ and $C_0$ are prepared in advance as a map that can be searched based on parameters indicating engine load conditions such as the engine rotational speed and the absolute air intake pipe pressure.

Figure 10:
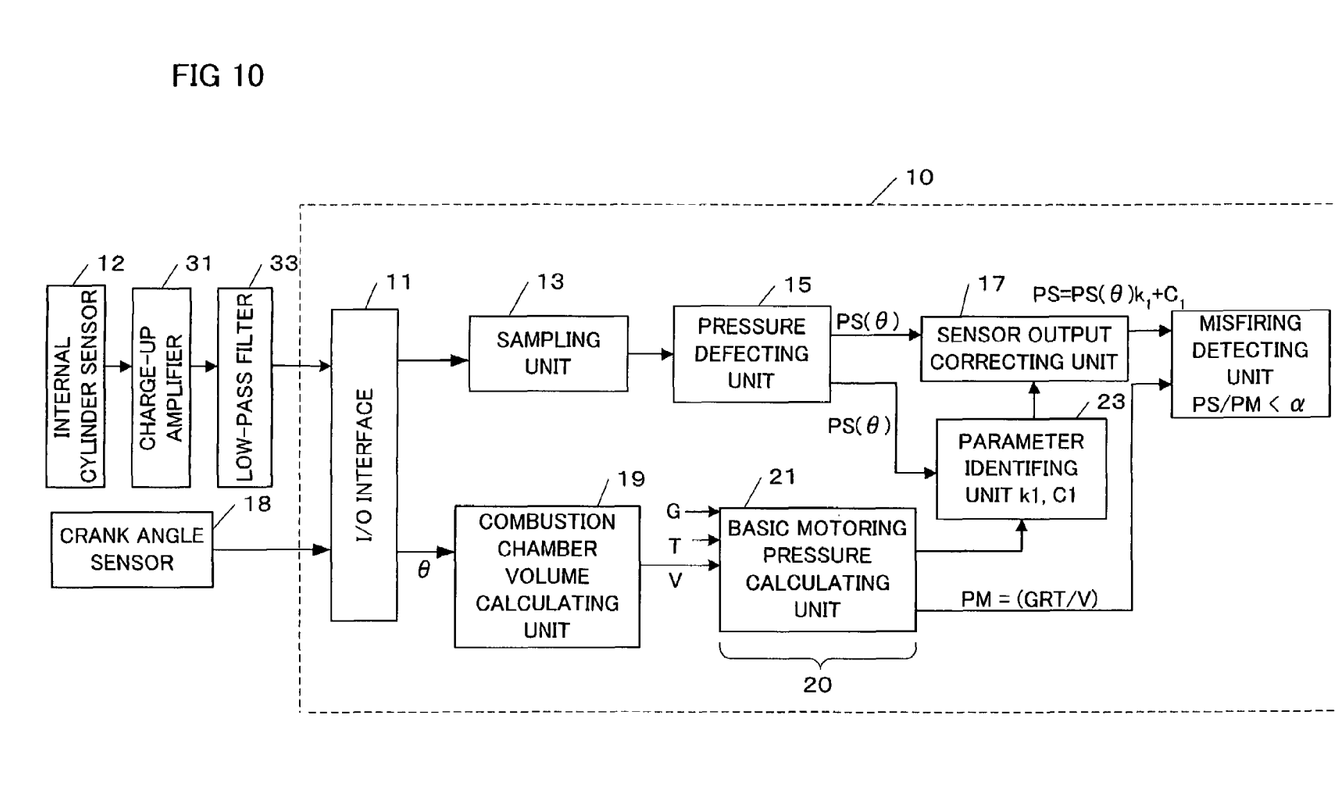
FIG. 10 shows functional blocks of a further embodiment of the present invention.

FIG. 10 is a block diagram of an overall structure of a combustion state detecting apparatus in accordance with a further embodiment of the present invention. Although a motoring pressure correcting unit 22 is not provided in this embodiment, a basic motoring pressure $GRT/V_c$ calculated in a basic motoring pressure calculating unit 21 is used as an estimated motoring pressure based on an equation of state for gases of a combustion chamber.

A parameter identifying unit 23 identifies parameters $k_1$ and $C_1$ in an correction equation to be used for correcting sensor outputs through the method of least squares to minimize a difference (PM−PS) between an estimated motoring pressure value PM calculated during a compression stroke by a motoring pressure estimating unit 20 and an internal pressure PS that is output by a sensor output correcting unit 17 after a correction upon an output from the internal pressure sensor 12. A sensor output detecting unit 15 samples the output of the pressure sensor in a period of $\frac{1}{10}$ kHz for example. The sensor output detecting unit 15 provides an average of the sample values as a sensor output value PS($\theta$) to a parameter identifying unit 23 in a timing that is synchronized with the crank angle. The parameter identifying unit 23 performs an identification operation in order to identify parameters of a correction equation during a compression stroke of a cylinder. The identification operation obtains $k_1$ and $C_1$ through the known method of least squares to minimize $(PM(\theta)-PS(\theta)k_1-C_1)^2$, that is, a square of a difference between an estimated motoring pressure value PM($\theta$) obtained by the motoring pressure correcting unit in accordance with the crank angle and a value PS obtained by applying a correction equation $PS=PS(\theta)k_1+C_1$ to the sensor output value PS($\theta$) in the same crank angle.

By expressing discrete values of the PM with y(i), sample values (discrete values) of the internal pressure PS obtained from the internal pressure sensor with x(i), following expressions are obtained: $PM^T=[y(0), y(1), \ldots, y(n)]$, $PS^T=[x(0), x(1), \ldots, x(n)]$. A sum of squares of the discrete values of the error (PM−PS) is expressed as in Equation (12). It is assumed that the sample value is taken in an interval of 1/10 kHz and the value of "i" is limited up to, for example, 100.

$$F = \sum [y(i) - (kx(i) + C)]^2 \qquad (12)$$
$$= \sum [y(i)^2 - 2y(i) \times (kx(i) + C) + (kx(i) + C)^2]$$

k and C for minimizing the value of F are obtained as the values of k and C when a partial differential with respect to each of k and C for F(k, C) becomes zero. These values are obtained through Equation (13) and Equation (14).

$$\partial F/\partial k = \Sigma[-2y(i)x(i)+2kx(i)^2+2Cx(i)]=0 \qquad (13)$$

$$\partial F/\partial C = \Sigma[-2y(i)+2C+2kx(i)]=0 \qquad (14)$$

By simplifying the right sides of these equations, Equation (13)' and Equation (14)' are obtained.

$$\Sigma y(i)x(i)=k\Sigma x(i)^2+C\Sigma x(i) \qquad (13')$$

$$\Sigma y(i)=k\Sigma x(i)+C\times n \qquad (14')$$

By expressing these equations by a matrix, Equation (15) is obtained.

$$\begin{bmatrix} \sum y(i)x(i) \\ \sum y(i) \end{bmatrix} = \begin{bmatrix} \sum x(i)^2 & \sum x(i) \\ \sum x(i) & n \end{bmatrix} \begin{bmatrix} k \\ C \end{bmatrix} \qquad (15)$$

Furthermore, Equation (15) can be transformed into Equation (16) by using an inverse matrix.

$$\begin{bmatrix} k \\ C \end{bmatrix} = \begin{bmatrix} \sum x(i)^2 & \sum x(i) \\ \sum x(i) & n \end{bmatrix}^{-1} \begin{bmatrix} \sum y(i)x(i) \\ \sum y(i) \end{bmatrix} \qquad (16)$$

The inverse matrix in the right side is expressed as in Equation (17).

$$\begin{bmatrix} \sum x(i)^2 & \sum x(i) \\ \sum x(i) & n \end{bmatrix}^{-1} = \frac{1}{DET} \begin{bmatrix} n & -\sum x(i) \\ -\sum x(i) & \sum x(i)^2 \end{bmatrix} \qquad (17)$$

$$DET=\Sigma x(i)^2 \times n - \Sigma x(i) \times \Sigma x(i)$$

(where, DET≠0)

The sensor output correcting unit 17 corrects the sensor output in a combustion stroke by using such identified parameters.

In the period "b" (FIG. 9) after the ignition time, a misfiring determining unit 27 determines an occurrence or no occurrence of misfiring based on the value PS of the internal pressure detected by the internal pressure sensor 12 and corrected by the sensor output correcting unit 17 and the estimated motoring pressure value PM calculated at the same time by the motoring pressure estimating unit 20. In this embodiment, the misfiring determining unit 27 determines that a misfiring has occurred when a ratio of PS/PM is smaller than a predetermined threshold value α.

The processes shown in FIG. 4 through FIG. 7 are applied to these alternative embodiments as well.

FIG. 10 shows functional blocks of yet further embodiment of the present invention. Same elements as in FIG. 8 are given the same reference codes. A difference from the embodiment shown in FIG. 8 is in that a motoring pressure correcting unit 22 is not provided in this embodiment. A basic motoring pressure calculated in a basic motoring pressure calculating unit 21 is used as an estimated motoring pressure based on an equation of state for gases of a combustion chamber.

In this embodiment, a process for a misfiring judgment is performed only once in one cycle of vehicle driving operation. As a variation, the process may be performed several times in one cycle of vehicle driving operation. If the misfiring occurs frequently, the exhaust temperature may increase and accordingly the catalyst may deteriorate because unburned fuel is sent out to the exhaust system and burned therein. Besides, emission may deteriorate because gases including unburned fuel are exhausted. Therefore, the misfiring judgment is required in view of catalyst protection as well as in view of exhaust gas regulations.

It is examined whether a parameter that is set for the misfiring judgment exceeds a determination value. When the parameter exceeds the determination value, the misfiring MIL is set to ON and a misfiring warning is issued. Specifically, the misfiring warning includes such method as turn on a warning light in the driver's panel, inform the driver via voice at an engine starting time to suggest a repair, or, switch a vehicle mode forcibly to an abnormal driving mode to enforce a repair.

Although the present invention has been above described with reference to specific embodiments, the present invention is not limited to those specific embodiments. Besides, the present invention can be used for either gasoline engines or diesel engines.

What is claimed is:

1. A combustion state detecting apparatus for an internal-combustion engine having internal pressure detecting means for detecting an internal pressure of a combustion chamber of the engine and crank angle detecting means for detecting a crank angle of the engine, the apparatus comprising:
    calculation means for calculating a volume of the combustion chamber based on the crank angle detected by the crank angle detecting means;
    estimation means for estimating a motoring pressure of the engine in accordance with a calculation equation using the calculated volume;
    adjustment means for adjusting either of the pressure detected by the internal pressure detecting means and the pressure estimated by the estimation means during a compression stroke of the engine to minimize the error between the detected pressure and the estimated pressure; and
    determination means for determining a combustion state during a combustion stroke of the engine based on a relation between the pressure adjusted by the adjustment means and the other pressure.

2. The apparatus of claim 1, wherein the adjustment means comprises identification means for identifying parameters of the calculation equation during a compression stroke of the engine to minimize the error between the pressure detected by the internal pressure detecting means and the pressure estimated by the estimation means; and
    wherein the determination means determines the combustion state based on a relation between the detected pressure and the estimated pressure that is adjusted to minimize the error.

3. The apparatus of claim 1, wherein the adjustment means comprises:
   modification means for modifying, during a compression stroke of the engine, the pressure detected by the internal pressure detecting means in accordance with a modification equation; and
   identification means for identifying parameters of the modification equation to minimize the error between the pressure modified by the modification means and the pressure estimated by the estimation means, and
   wherein the determination means determines a combustion state based on the estimated pressure and the detected pressure that is modified to minimize the error.

4. The apparatus of claim 2, wherein the calculation equation comprises an equation of state for gases in the combustion chamber and the identification of the parameters are performed in a crank angle during an interval from a close of an air intake valve up to a transition to a combustion stroke.

5. The apparatus of claim 4, wherein the estimation means comprises:
   motoring pressure calculating means for calculating a motoring pressure based on the combustion chamber volume calculated by the calculating means; and
   modification means for modifying the motoring pressure by using the parameters identified by the identification means.

6. The apparatus of claim 2, wherein the identification means is structured to calculate a standard deviation between the estimated pressure values and the detected pressures and then determine that the standard deviation between the estimated pressure values and the detected pressures converges when the standard deviation is equal to or smaller than a predetermined value to adopt the identified parameters.

7. The apparatus of claim 3, wherein the identification means is structured to calculate a standard deviation between the estimated pressure values and the detected pressures and then determine that the standard deviation between the estimated pressure values and the detected pressures converges when the standard deviation is equal to or smaller than a predetermined value to adopt the identified parameters.

8. The apparatus of claim 1, wherein the determination means determines a misfiring in the engine.

9. The apparatus of claim 8, wherein the determination of the misfiring is performed through comparison of a ratio between the estimated pressure and the detected pressure with a predetermined value.

10. The apparatus of claim 3, wherein the estimation means comprises:
    motoring pressure calculating means for calculating a basic motoring pressure based on the combustion chamber volume calculated by the calculating means.

11. The apparatus of claim 10, wherein the estimation means comprises:
    modification means for modifying the basic motoring pressure by using predetermined parameters.

12. A method of detecting a combustion state for an internal-combustion engine having internal pressure detecting means for detecting an internal pressure of a combustion chamber of the engine and crank angle detecting means for detecting a crank angle of the engine, the method including steps of:
    calculating a volume of the combustion chamber based on the crank angle detected by the crank angle detecting means;
    estimating a motoring pressure of the engine in accordance with a calculation equation using the calculated volume;
    adjusting either of the pressure detected by the internal pressure detecting means and the pressure estimated in the estimating step during a compression stroke of the engine to minimize the error between the detected pressure and the estimated pressure; and
    determining a combustion state during a combustion stroke of the engine based on a relation between the pressure adjusted in the adjusting step and the other pressure.

13. The method of claim 12, wherein the adjusting step includes a step of identifying parameters of the calculation equation during a compression stroke of the engine to minimize the error between the pressure detected by the internal pressure detecting means and the pressure estimated in the estimating step; and
    wherein the determining step includes a step of determining a combustion state based on a relation between the detected pressure and the estimated pressure that is adjusted to minimize the error.

14. The method of claim 12, wherein the adjusting step includes steps of:
    modifying, during a compression stroke of the engine, the pressure detected by the internal pressure detecting means in accordance with a modification equation; and
    identifying parameters of the modification equation to minimize the error between the pressure modified in the modifying step and the pressure estimated in the estimating step, and
    wherein the determining step includes a step of determining a combustion state based on the estimated pressure and the detected pressure that is modified to minimize the error.

15. The method of claim 13, wherein the calculation equation comprises an equation of state for gases in the combustion chamber and the identification of the parameters are performed in a crank angle during an interval from a close of an air intake valve up to a transition to a combustion stroke.

16. The method of claim 15, wherein the estimating step includes steps of:
    calculating a motoring pressure based on the combustion chamber volume calculated in the calculating step; and
    modifying the motoring pressure by using the parameters identified in the identifying step.

17. The method of claim 13, wherein the identifying step includes a step of calculating a standard deviation between the estimated pressure values and the detected pressures and determining that the standard deviation between the estimated pressure values and the detected pressures converges when the standard deviation is equal to or smaller than a predetermined value to adopt the identified parameters.

18. The method of claim 14, wherein the identifying step includes a step of calculating a standard deviation between the estimated pressure values and the detected pressures and determining that the standard deviation between the estimated pressure values and the detected pressures converges when the standard deviation is equal to or smaller than a predetermined value to adopt the identified parameters.

19. The method of claim 12, wherein the determining step includes a step of determining a misfiring in the engine.

20. The method of claim 19, wherein the determining step includes a step of determining the misfiring through comparison of a ratio between the estimated pressure and the detected pressure with a predetermined value.

* * * * *